J. A. KENNEDY.
Portable Grain and Hay Feed-Rack.
No. 226,757. Patented April 20, 1880.
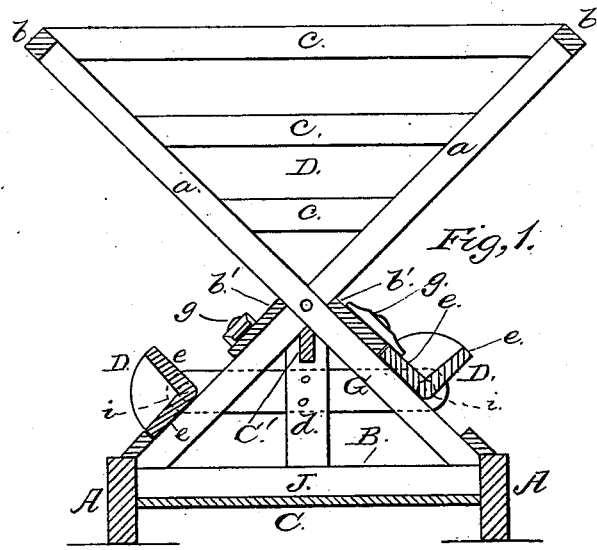
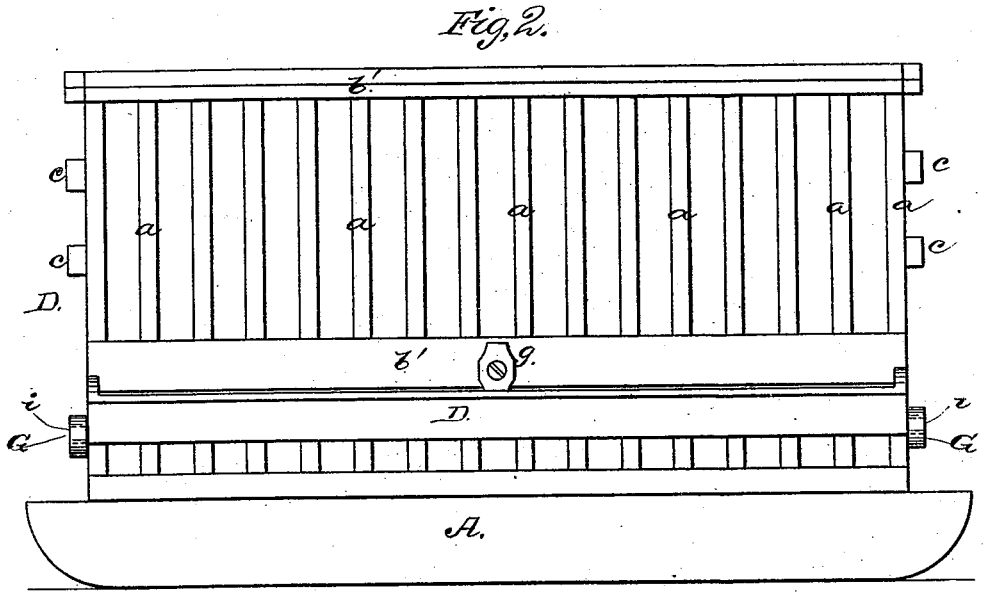
WITNESSES
Mary J. Utley
F. J. Masi
INVENTOR
John A. Kennedy,
by E. W. Anderson
his ATTORNEY

UNITED STATES PATENT OFFICE.

JOHN A. KENNEDY, OF LONDON, OHIO.

PORTABLE GRAIN AND HAY FEED-RACK.

SPECIFICATION forming part of Letters Patent No. 226,757, dated April 20, 1880.

Application filed February 27, 1880.

*To all whom it may concern:*

Be it known that I, JOHN A. KENNEDY, of London, in the county of Madison and State of Ohio, have invented a new and valuable Improvement in Portable Grain and Hay Feed-Racks; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a vertical cross-section of my improved rack, and Fig. 2 is a side view of the same.

This invention has relation to portable combined hay and grain racks and seed-savers; and it consists in the novel arrangement of the various devices used, as will be hereinafter more fully set forth.

In the annexed drawings, the letter A designates runners arranged at a proper distance apart, and connected together at proper intervals by the braces B. The space bounded by the runners and the end braces is provided with a floor, C, secured to the under side of the braces, and a receptacle is thus formed for the reception of the seed dropping from the rack D. This is composed of a number of rails, $a$, halved into each other at their point of crossing, and maintained at a proper distance apart by the strips $b$ at their upper ends and the strip $b'$ below their points of intersection. The ends of the receptacle above the joint of the rails are closed by the spaced slats $c$.

C' indicates a strong beam supported from the braces B of the sled by the uprights $d$, and resting snugly against the rails in the angle formed by their lower branches.

If desired, the upper edge of the supporting-beam C may be notched to receive the rails composing the rack.

The strip $b'$ aforesaid is of considerable width, and with the sides $e$ of an angular trough, D, closes the upper part of that portion of the rack below the joint of the rails. These troughs are at each side of the rack, and are provided at their ends with journals $i$, projecting from their lower edges, and having their bearings in cross-bars G, rigidly secured to the uprights $d$ and extending laterally beyond the sides of the rack. The weight of the feed in the troughs is thus taken off the rack, which, being thus relieved of heavy strain, may be made of comparatively light timber, and the more readily hauled from place to place.

The troughs are readily thrown into the position shown in the left of Fig. 1, when they may be readily cleansed and drained, and will not catch the rain. In this position they also serve to prevent light seed fallen into the receptacle J from being blown out therefrom. When used for feeding purposes they are held against downward vibration by means of buttons $g$ on the strips $b'$.

What I claim as new, and desire to secure by Letters Patent, is—

The combination of a sled, a hay-rack mounted thereon, the uprights $d$, erected on the sled, the cross-bars G, secured thereto, and the feed-troughs journaled in said cross-bars, substantially as specified.

In testimony that I claim the above I have hereunto subscribed my name in the presence of two witnesses.

JOHN A. KENNEDY.

Witnesses:
DANIEL T. FOX,
GEO. W. ATHEY.